US009094409B2

(12) United States Patent
Zhang et al.

(10) Patent No.: US 9,094,409 B2
(45) Date of Patent: *Jul. 28, 2015

(54) METHOD FOR CONFIGURING ACCESS RIGHTS, CONTROL POINT, DEVICE AND COMMUNICATION SYSTEM

(71) Applicant: Huawei Device Co., Ltd., Shenzhen (CN)

(72) Inventors: Qinliang Zhang, Shenzhen (CN); Huangwei Wu, Shenzhen (CN); Ping Fang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 11 days.

This patent is subject to a terminal disclaimer.

(21) Appl. No.: 13/939,430

(22) Filed: Jul. 11, 2013

(65) Prior Publication Data
US 2013/0305393 A1 Nov. 14, 2013

Related U.S. Application Data

(63) Continuation of application No. 13/248,897, filed on Sep. 29, 2011, now Pat. No. 8,521,877, which is a continuation of application No. PCT/CN2009/076097, filed on Dec. 26, 2009.

(51) Int. Cl.
| | |
|---|---|
| *G06F 15/16* | (2006.01) |
| *H04L 29/06* | (2006.01) |
| *G06F 21/62* | (2013.01) |
| *H04L 12/28* | (2006.01) |

(52) U.S. Cl.
CPC .......... *H04L 63/101* (2013.01); *G06F 21/6218* (2013.01); *H04L 12/2809* (2013.01); *H04L 12/2821* (2013.01)

(58) Field of Classification Search
USPC ........ 709/220, 225; 707/9; 455/410; 713/170
See application file for complete search history.

(56) References Cited

U.S. PATENT DOCUMENTS

| | | | | |
|---|---|---|---|---|
| 2005/0071636 | A1* | 3/2005 | Lee et al. ..................... | 713/170 |
| 2005/0266826 | A1* | 12/2005 | Vlad .............................. | 455/410 |
| 2006/0156388 | A1* | 7/2006 | Stirbu et al. ...................... | 726/4 |

(Continued)

FOREIGN PATENT DOCUMENTS

| | | |
|---|---|---|
| CH | 1604519 A | 9/2004 |
| CN | 101006701 A | 7/2007 |

(Continued)

OTHER PUBLICATIONS

Ellison, Carl "SeburityConsole: 1 Service Template for UPnP™ Device Architecture 1.0" Contributing Members of the UPnP™ Forum. Nov. 17, 2003.

(Continued)

*Primary Examiner* — Tammy Nguyen
(74) *Attorney, Agent, or Firm* — Brinks Gilson & Lione

(57) ABSTRACT

In a method for configuring access rights, a UPnP (Universal Plug and Play) device receives CPID information sent by a first CP without administrator rights, wherein the CPID information comprises an ID of another CP obtained by the first CP. Then the UPnP device sends a CPID list that carries the CPID information to a second CP with administrator rights. And the UPnP device receives a CP right configuration command sent by the second CP, and configures access rights for at least one CP corresponding to a CPID in the CPID list.

19 Claims, 6 Drawing Sheets

(56) References Cited

U.S. PATENT DOCUMENTS

| | | |
|---|---|---|
| 2007/0162755 A1 | 7/2007 | Costa-Requena et al. |
| 2007/0174282 A1* | 7/2007 | Matsuda et al. ............... 707/9 |
| 2008/0095374 A1* | 4/2008 | Schreyer .................. 380/282 |
| 2008/0104391 A1* | 5/2008 | Fukuta et al. ............. 713/153 |

FOREIGN PATENT DOCUMENTS

| | | |
|---|---|---|
| CN | 101390365 A | 3/2009 |
| CN | 101521575 A | 9/2009 |
| JP | 2007188184 A | 7/2007 |
| JP | 2008109454 A | 5/2008 |
| WO | 2015507 A1 | 1/2009 |

OTHER PUBLICATIONS

International Search Report issued in corresponding PCT Application No. PCT/CN2009/076097, mailed Apr. 8, 2010.

Extended European Search Report issued in corresponding European Patent Application No. 09842897.2, mailed Jul. 19, 2012.

Written Opinion of the International Search Report issued in corresponding PCT Application No. PCT/CN2009/076097 (including English Translation); mailed Apr. 8, 2010.

English translated claims from corresponding PCT Application No. PCT/CN2009/076097 (including Verification of Translation).

Office Action issued in corresponding Japanese Patent Application No. 2012-503849, mailed Mar. 19, 2013.

* cited by examiner

METHOD FOR CONFIGURING ACCESS RIGHTS, CONTROL POINT, DEVICE AND COMMUNICATION SYSTEM

CROSS-REFERENCE TO RELATED APPLICATIONS

This application is a continuation of U.S. patent application Ser. No. 13/248,897, filed on Sep. 29, 2011, which is a continuation of International Application No. PCT/CN2009/076097, filed on Dec. 26, 2009. The International Application claims priority to Chinese Patent Application No. 200910081961.9, filed on Apr. 9, 2009. The afore-mentioned patent applications are hereby incorporated by reference in their entireties.

FIELD OF THE INVENTION

The present invention relates to network communication technologies, and in particular, to a method for configuring access rights, a Control Point (CP), a device, and a communication system.

BACKGROUND

Universal Plug and Play (UPnP) enables communication and resource sharing between home network devices in a digital home network. The UPnP network based on the UPnP technology is a network architecture designed to set up a Peer to Peer (P2P) network between home network devices. In a UPnP device system, the user interacts with a CP in the UPnP to control the home network devices. By invoking relevant applications, the CP reads the state and control information of each UPnP device in the home network through certain media based on the UPnP protocol, performs relevant processing to generate user interface data, and presents the user interface data to the user through graphics, texts or multimedia.

A UPnP network may include multiple CPs. The UPnP technology provides a security service which enables multiple CPs to perform security control for all UPnP devices in the network. Through the security service, different levels of access rights are configured for the CPs, thus ensuring communication security between UPnP devices in the network. In order to configure access rights for multiple CPs in the network respectively, it is necessary to obtain the ID information of each CP in the network. In the prior art, a dedicated apparatus (namely, console) is deployed in the UPnP network to obtain the ID information of each CP in the network. The access rights for all CPs are deployed in a centralized way, and therefore, access rights are configured for each CP respectively.

In the process of developing the present invention, the inventor finds that the prior art uses a dedicated apparatus (namely, console) to obtain ID information of each CP in the network and configure the access rights of each CP; and the construction of a UPnP network involves at least three types of apparatuses: console, CP, and UPnP device. The network construction in the prior art is rather complicated.

SUMMARY

The embodiments of the present invention provide a method for configuring access rights, a CP, a device, and a communication system to simplify networking at time of configuring access rights of CPs.

A method configuring access rights in an embodiment of the present invention includes:

receiving Control Point Identifier (CPID) information sent by a first Control Point (CP) without administrator rights, wherein the CPID information comprises an identifier (ID) of the first CP and/or an IDs of another CP obtained by the first CP;

sending a CPID list that comprises the CPID information to a second CP with administrator rights; and receiving a CP right configuration command sent by the second CP, and configuring access rights for CPs corresponding to CPIDs in the CPID list.

A device provided in an embodiment of the present invention includes:

a CPID information receiving module, adapted to receive CPID information sent by a first Control Point (CP) without administrator rights, wherein the CPID information comprises an identifier (ID) of the first CP and/or an ID of another CP obtained by the first CP;

a CPID information sending module, adapted to send a CPID list that comprises the CPID information to a second CP with administrator rights; and a right configuring module, adapted to: receive a CP right configuration command sent by the second CP, and configure access rights for CPs corresponding to CPIDs in the CPID list.

A CP provided in an embodiment of the present invention includes:

a CPID information sending module, adapted to send CPID information to a device, wherein the CPID information comprises an identifier (ID) of this CP and/or an ID obtained from another CP;

a CPID information obtaining module, adapted to obtain a CPID list that comprises CPID information from the device; and a CP right configuring module, adapted to send a CP right configuration command to the device, wherein the command instructs the device to configure access rights for CPs corresponding to CPIDs in the CPID list.

A communication system provided in an embodiment of the present invention includes: a first CP without administrator rights, a second CP with administrator rights, and a device.

The first CP is adapted to send CPID information to the device, where the CPID information includes an ID of the first CP and/or an ID of another CP obtained by the first CP.

The second CP is adapted to: obtain a CPID list that carries the CPID information from the device, and send a CP right configuration command to the device, where the command instructs the device to configure access rights for CPs corresponding to CPIDs in the CPID list.

The device is adapted to: receive the CPID information sent by the first CP, send the CPID list that carries the CPID information to the second CP, and configure access rights for the CPs in the CPID list after receiving a CP right configuration command sent by the second CP.

In the method for configuring access rights, CP, device and communication system provided in the embodiments of the present invention, any CP can play the role of configuring access rights for other CPs in the network. Therefore, in the process of constructing the network, it is not necessary to deploy a dedicated apparatus for configuration and management. The information about all CPs in the network can be obtained through only two types of apparatuses, namely, CP and device. According to the obtained CP information, the access rights of other CPs are configured and managed, thus simplifying the networking.

BRIEF DESCRIPTION OF THE DRAWINGS

To make the technical solution in the present invention clearer, the following outlines the accompanying drawings for illustrating the embodiments of the present invention. Apparently, the accompanying drawings outlined below are for the exemplary purpose only, and persons of ordinary skill in the art can derive other drawings from such accompanying drawings without creative effort.

DETAILED DESCRIPTION OF THE EMBODIMENTS

The following detailed description is directed to the technical solution in the embodiments of the present invention with reference to the accompanying drawings. However, the embodiments to be described are only a part of, rather than all of, the embodiments of the present invention. Additionally, all other embodiments, which can be derived by those skilled in the art from the embodiments given herein without any creative efforts, fall within the scope of the present invention.

Figure 1:
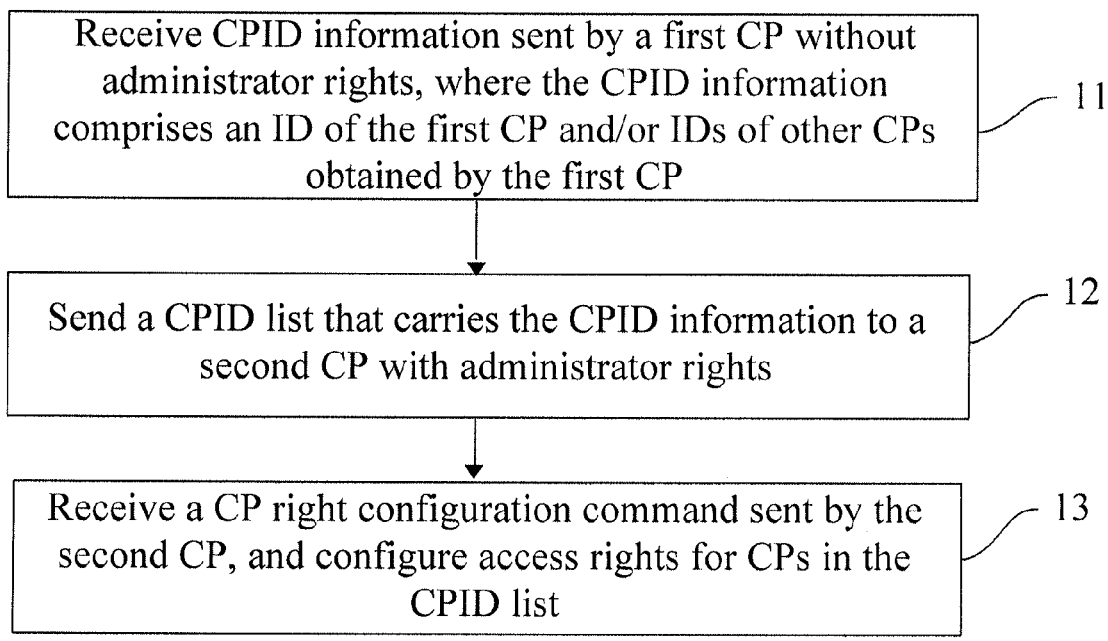
FIG. 1 is a flowchart of a method for configuring access rights in the first embodiment of the present invention.

FIG. 1 is a flowchart of a method for configuring access rights in the first embodiment of the present invention. The entity that implements the steps of this embodiment is a device in the UPnP network. This embodiment describes the method for obtaining CP information from the perspective of the UPnP device. As shown in FIG. 1, the method for configuring access rights in this embodiment includes the following steps:

Step 11: Receive CPID (Control Point Identifier) information sent by a first CP without administrator rights.

The CPID information includes the ID of the first CP and/or the IDs of other CPs obtained by the first CP. An ID may be a CP public key, a hash value of the CP public key, or other information for identifying the CP.

Step 12: Send a CPID list that carries the CPID information to a second CP with administrator rights.

All CPs in the network in this embodiment are apparatuses of the same type. Any CP may send its ID and/or IDs of other CPs obtained by itself to the UPnP device; and any CP can obtain the CPID list that carries the obtained CPIDs from the UPnP device. In this way, any CP in the network can be configured to have administrator rights or have no administrator rights as required. The CP with administrator rights refers to a CP entitled to manage or control UPnP devices, or entitled to allocate access rights to other CPs. In step 11 and step 12, the CP with administrator rights is the second CP in this embodiment, and the CP with no administrator rights is the first CP in this embodiment; and the second CP with administrator rights can configure access rights for the first CP without administrator rights in the CPID list according to the CPID list obtained from the UPnP device.

Step 13: Receive a CP right configuration command sent by the second CP, and configure access rights for CPs in the CPID list.

The second CP with administrator rights sends a right configuration command to the UPnP device. The right configuration command may carry the ID information of the CP requiring configuration of access rights, and the access rights of the corresponding CP. The access rights may be used by the UPnP device to exercise access control on a command from the corresponding CP, for example, authenticate the command from the corresponding CP. After the command from the CP passes the authentication, the UPnP device executes the command; otherwise, the UPnP device forbids access from the CP. To facilitate the UPnP device to obtain the CPID and facilitate any CP to obtain IDs of other CPs, the UPnP device does not perform security authentication for the CPID obtaining command sent by the first CP to the UPnP device or for the CPID obtaining command sent by the second CP to the UPnP device, but stores the obtained CPID information onto the UPnP device or submits the stored CPID information to the CR In the networking process of configuring access rights of the CP in this embodiment, it is not necessary to deploy any dedicated apparatus for configuration and management. The information about all CPs in the network can be obtained through only two types of apparatuses (namely, CP and UPnP device), thus simplifying the networking. In practice, any CP may be set as a second CP that holds administrator rights as required, and the second CP configures access rights for other CPs. If the second CP fails, another CP in the network may be set as a CP that holds administrator rights, without changing the existing deployment conditions of the network; and this CP configures access rights for other CPs. Therefore, networking flexibility is improved significantly, and the network security is enhanced.

Figure 2:
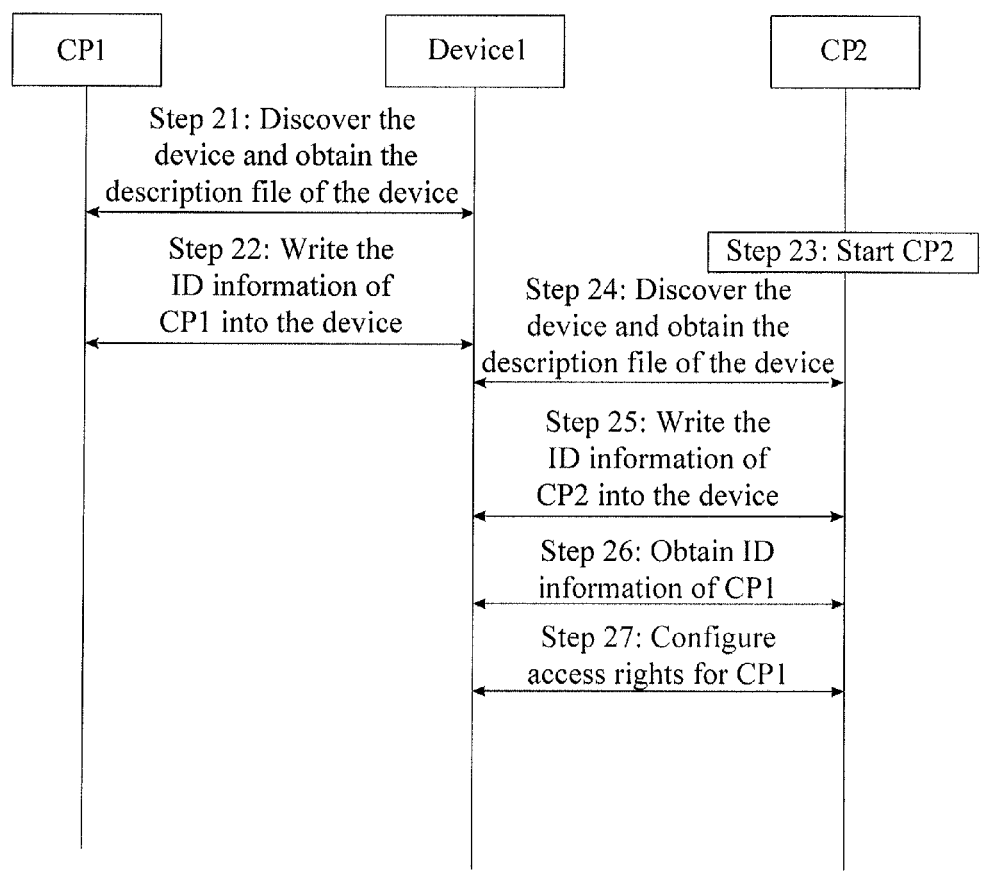
FIG. 2 shows signaling interaction of a method for configuring access rights in the second embodiment of the present invention.

FIG. 2 shows signaling interaction of a method for configuring access rights in the second embodiment of the present invention. The application scenario of this embodiment is: The UPnP network includes one UPnP device (device 1) and two CPs (CP1 and CP2); CP1 holds no administrator rights, and CP2 holds administrator rights. It is assumed that the UPnP device (device 1) and CP1 are started first. As shown in FIG. 2, the method for configuring access rights in this embodiment includes the following steps:

Step 21: Through a UPnP discovery mechanism, CP1 discovers a started UPnP device (device 1) in the current network and obtains description information of device 1.

When a UPnP device is added to the network or a UPnP device starts up, the UPnP device announces its services to the CPs in the network based on a UPnP discovery protocol such as Simple Service Discovery Protocol (SSDP). Also, at the time of adding the current CP into the network or starting the CP, the UPnP discovery protocol enables the current CP to search the network for the desired UPnP device. In both circumstances above, the UPnP device broadcasts or multicasts the description document (or URL of the description document) of the UPnP device, and the current CP can obtain the description document of the corresponding device. The description document may be a device description document. The device description document may include device name, manufacturer name, and a Uniform Resource Locator (URL) for recording the service description document on the UPnP device. The CP may access the URL address to obtain the service description document of the UPnP device. The service description document may include parameters or variables (which may be status variables), and action commands.

For example, CP1 obtains device description information of the device. The device description information includes the URL for recording the service description document on the device. CP1 accesses the URL address to obtain the service description information of the device. The service description information records the service capabilities of the first UPnP device.

Step 22: CP1 adds its ID information in device 1.

In this step, CP1 does not need to have special rights such as administrator rights; and device 1 does not need to authenticate the access rights of CP1 when performing the corresponding operations of this step. In practice, a new command may be added to any service description in the service description document of device 1. Device 1 executes this command to store the received CPID information; or, a new URL is added to the device description document/service description document. The CPID information is written by the CP1 to the address identified by the URL. Through an event, device 1 may notify the stored content of the CPID list to all CPs in the network. The foregoing two methods are described below.

(1) A new command is added to any service description of the service description document of the UPnP device, and the UPnP device executes the command to store the received CPID information.

Here is an example: A new action command WriteCPID( ) is added to the description of the protection service of the service description document of the UPnP device. The action command WriteCPID( ) includes CPID information.

TABLE 1

Parameters of an added action command WriteCPID( ) in a protection service

| Parameter name | Direction | Remarks |
|---|---|---|
| Identity | Input parameter | CPID |

As shown in Table 1, the added action command WriteCPID( ) in the protection service description is an instruction of adding CPID information, and "Identity" is a CPID list parameter, which may include one or more CPIDs. CP1 sends an action command WriteCPID( ) to device 1. After receiving the action command WriteCPID( ), device 1 does not need to authenticate the WriteCPID( ), but executes it directly. If no CP1 ID information is stored on device 1, device 1 stores the CPID information. In this case, device 1 does not allocate rights to the CP.

(2) A new URL for storing CPID information is added to the device description document/service description document, and the CP1 writes the ID information of CP1 to an address identified by the URL.

Here is an example: Address description CPIDURL is added to a device description document or service description document. The address description indicates the URL for storing the CPID information on the UPnP device, for example, <CPIDURL>URL for CP ID</CPIDURL>.

CP1 sends an HTTP PUT message to device 1. The HTTP PUT message carries CPID information and CPIDURL for storing the CPID information. After receiving the message, device 1 stores the CPID information according to CPIDURL on device 1. In this case, device 1 does not allocate rights to the CP. The CPID information may be a hash value of the CP public key (for example, calculated out through a hash algorithm), a CP public key, or another ID that differentiates between CPs. For ease of memorization, information such as a CP name may be added to the CPID.

Step 23: It is assumed that CP2 is started.

Step 24: Through a UPnP discovery mechanism, CP2 discovers a started UPnP device (device 1) in the current network and obtains description information of device 1. This step is similar to step 21.

Step 25: CP2 adds its ID information in device 1. This step is similar to step 22.

Step 26: From device 1, CP2 obtains the CPID information received on device 1.

In this step, a new command may be added to any service description in the service description document of device 1. Device 1 executes this command to read the obtained CPID information on device 1; or, a new URL for storing CPID information is added to the device description document/ service description document, and CP1 ID information is read from the corresponding address identified by the URL; or, through an event, CP2 obtains the CPID list that includes the received CPID information on device 1, where the list is sent by device 1. The first two methods are described below.

(1) A new command is added to any service description of the service description document of the UPnP device, and the UPnP device executes the command to read the obtained CPID information on the UPnP device.

Here is an example: An action command ReadCPID( ) is added to protection service description in the device service description document.

TABLE 2

Parameters of an added action command ReadCPID( ) in a protection service

| Parameter name | Direction | Remarks |
|---|---|---|
| Identity | Output parameter | CPID |

As shown in Table 2, the added action command ReadCPID( ) in the protection service description instructs the UPnP device to read obtained CPID information on the UPnP device, and "Identity" is a CPID list parameter, which may include 0, 1 or multiple stored CPIDs. CP2 sends an action command ReadCPID( ) to device 1. After receiving the action command ReadCPID( ), device 1 does not need to authenticate the action command ReadCPID( ), but executes the action command ReadCPID( ), and sends a CPID list that carries CPID information obtained by device 1 to CP2.

(2) A new URL description is added to the device description document/service description document to indicate the address for storing CPID information on the UPnP device.

Here is an example: Address description CPIDURL, is added to a device description document or service description document. The address description indicates the URL for storing the CPID information on the UPnP device, for example, <CPIDURL>URL for CP ID</CPIDURL>.

CP2 sends an HTTP GET message that carries CPIDURL to device 1. After receiving the message, device 1 obtains the CPID list from the address corresponding to CPIDURL, and sends the CPID list to CP2.

In this embodiment, CP2 holds the administrator rights. In fact, CP2 can perform such an operation no matter whether CP2 holds the administrator rights or not, and device 1 does not need to authenticate the access rights of CP2 for such an operation.

CP1 may obtain ID information of CP2 from device 1 in a similar way (not illustrated in FIG. 2).

Step 27: CP2 allocates rights of accessing the device to CP1.

In this step, CP2 needs to have special rights such as administrator rights. It is assumed that CP2 has obtained the administrator rights. CP2 sends a right configuration command to device 1. The right configuration command may carry the ID of CP1 and access rights parameters of CP1. According to the right configuration command sent by CP2, device 1 allocates rights of accessing device 1 to CP1 Afterward, according to the configured access rights, device 1 authenticates the command from CP1, and therefore, CP1 can perform control operations for device 1 within the scope of access rights configured by CP2.

Every CP in the network in this embodiment may obtain information about other CPs. Different CPs as nodes of the network are equal in nature. A specific CP may be configured as required to have administrator rights. The CP with administrator rights configures access rights for other CPs. Therefore, it is not necessary to configure a dedicated apparatus for managing access rights of the CP, the networking complexity is reduced, and the networking flexibility is improved.

In this embodiment, it is assumed that the UPnP network is composed of two CPs and one UPnP device. However, it is understandable to those skilled in the art that the access rights can be configured for the CPs according to the technical solution similar to this embodiment when more CPs and/or more UPnP devices exist in the network.

Figure 3A:
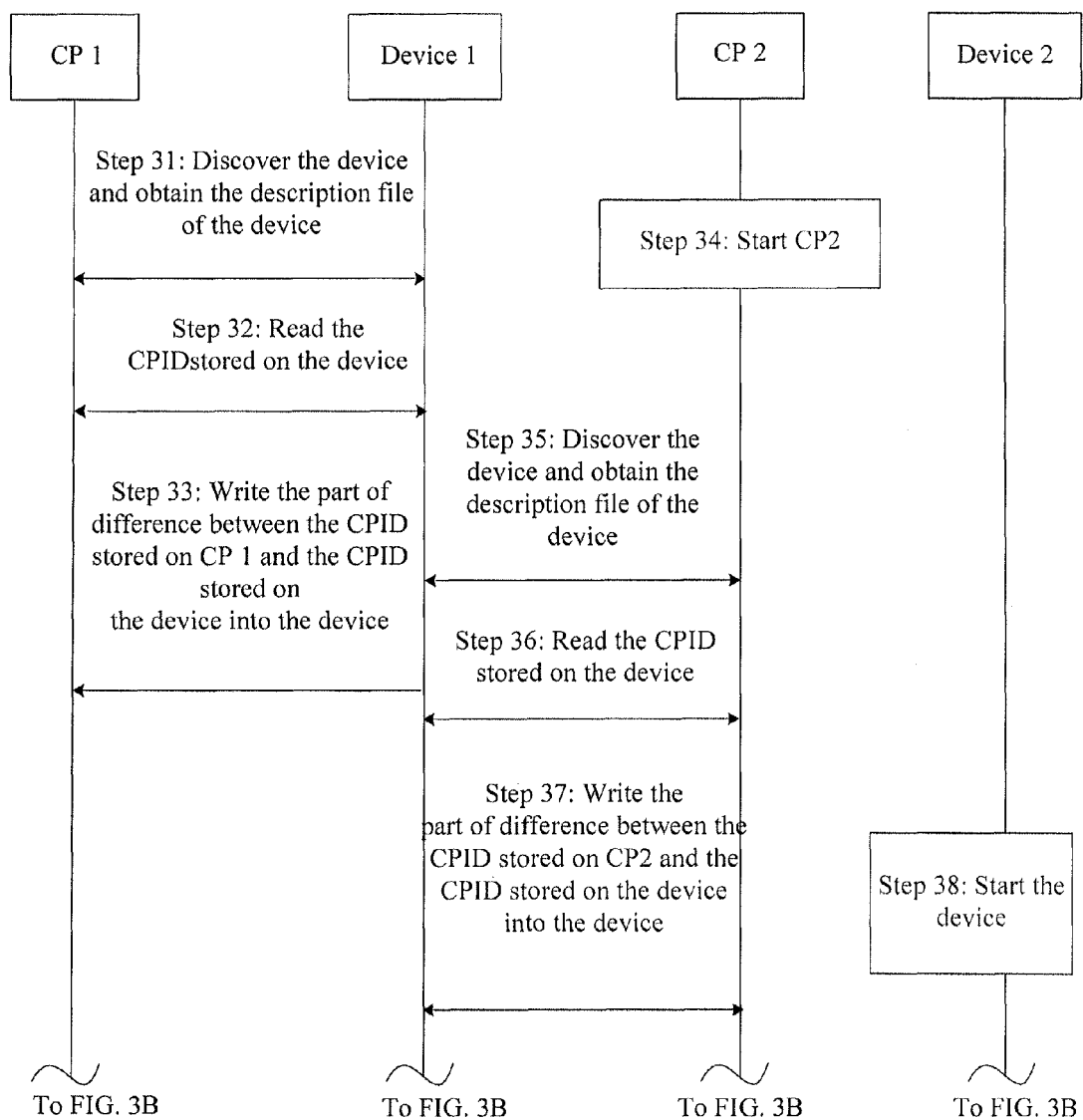
FIG. 3A and FIG. 3B show signaling interaction of a method for configuring access rights in the third embodiment of the present invention.
Figure 3B:
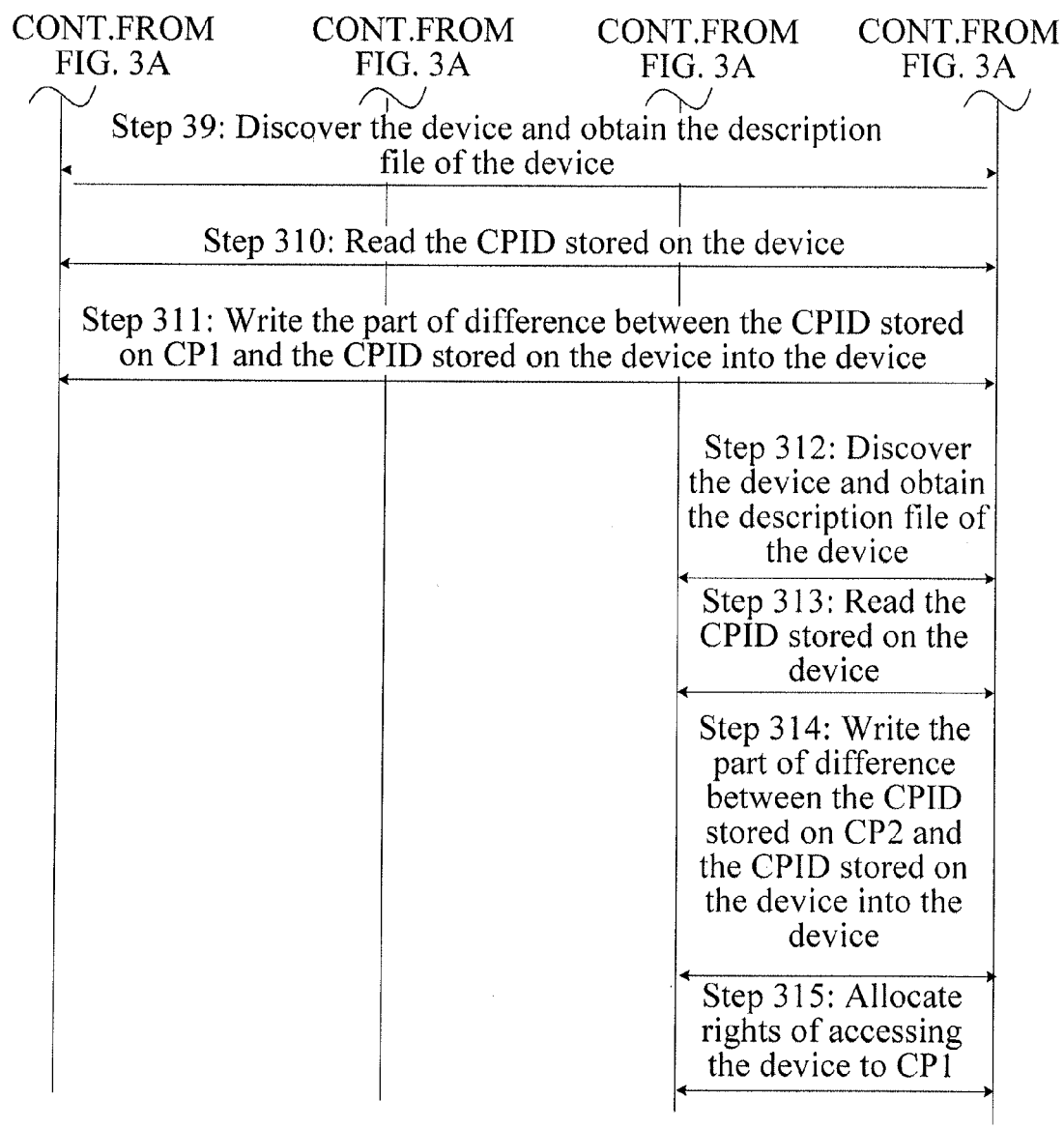

FIG. 3 shows signaling interaction of a method for configuring access rights in the third embodiment of the present invention. The application scenario of this embodiment is: The UPnP network includes two UPnP devices (device 1 and device 2) and two CPs (CP1 and CP2). In steps 31-314, CP1 and CP2 do not need to have administrator rights; in step 315, CP2 needs to have administrator rights. This embodiment differs from the embodiment shown in FIG. 2 in: The CP information written by the CP to device 1 and/or device 2 includes not merely the ID information of the CP in this embodiment, but also ID information of other CP(s). It is assumed that device 1 and CP1 are started first. As shown in FIG. 3, the method for configuring access rights in this embodiment includes the following steps:

Step 31: CP1 discovers started device 1 in the current network through a UPnP discovery mechanism, and obtains the description information of device 1. For details, see step 21 in the embodiment shown in FIG. 2.

Step 32: CP1 obtains the CPID information stored on device 1 according to the description document of device 1. For the method of CP1 obtaining the CPID information stored on device 1, see step 26 in the embodiment shown in FIG. 2.

Step 33: CP1 checks whether the CPID information stored on device 1 is the same as the CPID information stored on CP1, and adds the CPID information according to the check result. Here is an example:

If the CPID information stored on CP1 is completely or partially different from the CPID information stored on device 1, CP1 adds the part of difference between the CPID information on CP1 and the CPID information on device 1 to device 1. For detailed method of adding, see step 22 in the embodiment shown in FIG. 2.

If the CPID information stored on CP1 is completely the same as the CPID information stored on device 1, CP1 does not add the CPID information to device 1, thus improving efficiency of communication between the CP and device 1.

Step 34: It is assumed that CP2 is started.

Steps 35-37: CP2 discovers device 1 in the current network through a UPnP discovery mechanism, obtains a description document of device 1, and obtains the CPID stored on device 1. CP2 checks whether the CPID information stored on the first UPnP device (device 1) is the same as the CPID information stored on CP2, and adds the CPID information according to the check result. The detailed implementation mode is similar to steps 31-33.

Step 38: It is assumed that device 2 is started.

Steps 39-311: CP1 discovers device 2 in the current network through a UPnP discovery mechanism, obtains a description document of device 2, and reads the CPID stored on device 2 according to the description document of device 2. CP1 checks whether the CPID information stored on device 2 is the same as the CPID information stored on CP1, and writes the CPID information according to the check result. The detailed implementation mode is similar to steps 31-33.

Steps 312-314: CP2 discovers device 2 in the current network through a UPnP discovery mechanism, obtains a description document of device 2, and reads the CPID stored on device 2. CP2 checks whether the CPID information stored on the second UPnP device (device 2) is the same as the CPID information stored on CP2, and adds the CPID information according to the check result. The detailed implementation mode is similar to steps 31-33.

Step 315: CP2 allocates rights of accessing device 1 to CP1. For the mode of configuring and allocating the access rights, see step 27 in the embodiment shown in FIG. 2.

Also, CP2 allocates rights of accessing device 2 to CP1 (not illustrated in FIG. 3).

Every CP in the network in this embodiment may obtain information about other CPs. Different CPs as nodes of the network are equal in nature. A specific CP may be configured as required to have administrator rights. The CP with administrator rights configures access rights for other CPs. Therefore, it is not necessary to configure a dedicated apparatus for managing access rights of the CP, the networking complexity is reduced, and the networking flexibility is improved.

In this embodiment, it is assumed that the UPnP network is composed of two CPs and two UPnP devices. However, it is understandable to those skilled in the art that the CPID information can be obtained and the access rights can be configured for the CPs according to the technical solution similar to this embodiment when more CPs and/or more UPnP devices exist in the network.

Figure 4:
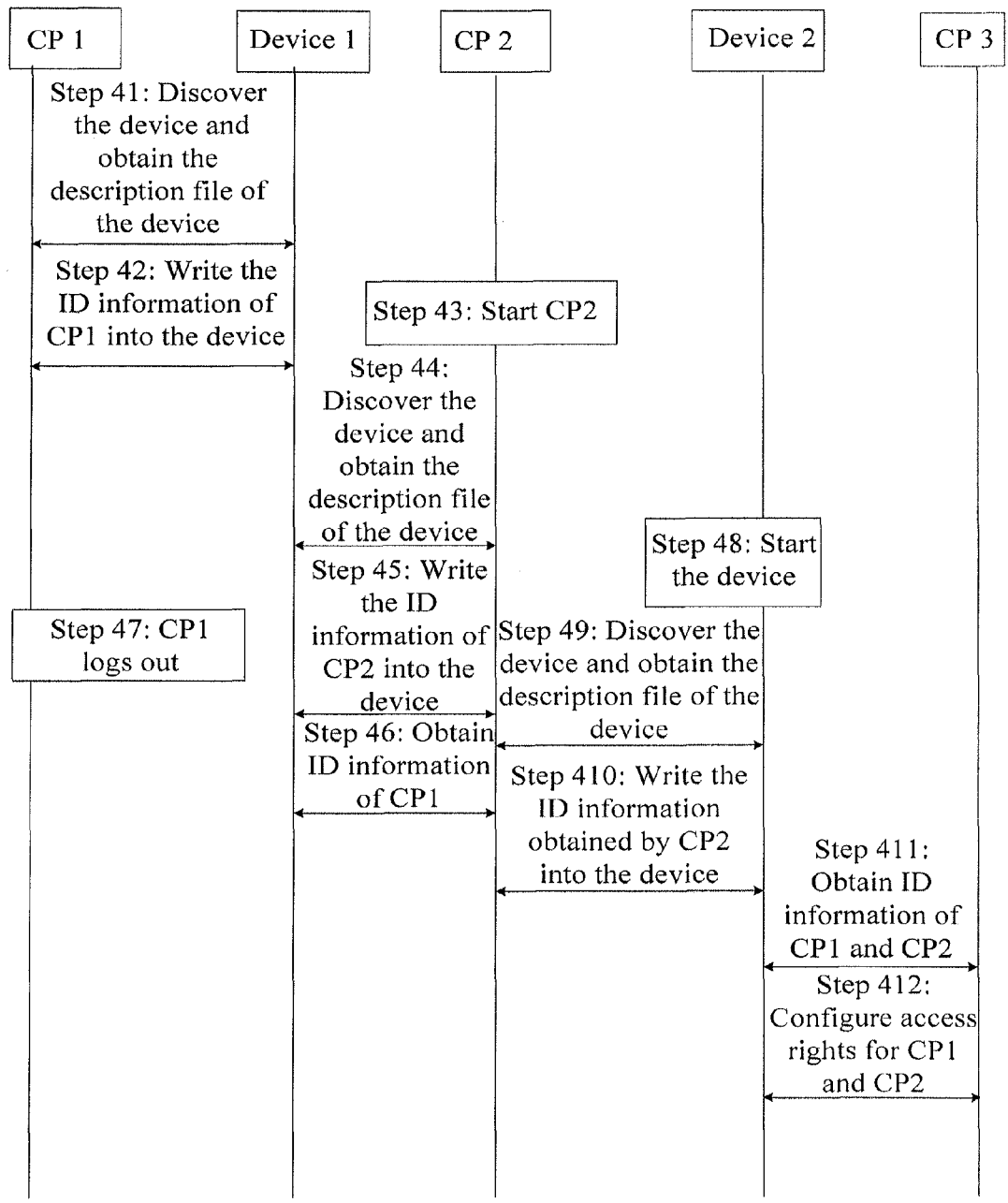
FIG. 4 shows signaling interaction of a method for configuring access rights in the fourth embodiment of the present invention.

FIG. 4 shows signaling interaction of a method for configuring access rights in the fourth embodiment of the present invention. The application scenario of this embodiment is: The UPnP network includes two UPnP devices (device 1 and device 2) and three CPs (CP1, CP2, and CP3). CP1 and CP2 have no administrator rights; and CP3 has administrator rights. It is assumed that device 1 and CP1 are started first. As shown in FIG. 4, the method for configuring access rights in this embodiment includes the following steps:

Steps 41-46 are similar to steps 21-26 in the embodiment shown in FIG. 2 except that neither CP1 nor CP2 has administrator rights in this embodiment.

Steps 47-48: It is assumed that CP1 logs out, and device 2 is started after logout of CP1.

Step 49: CP2 discovers device 2 through a UPnP discovery mechanism, and obtains description information of device 2.

Step 410: CP2 adds the obtained CPID to device 2.

The CPID information added by CP2 to device 2 may include ID of CP1 and ID of CP2. The method for adding the CPID is similar to step 22 in the embodiment shown in FIG. 2. After receiving the CPID information from CP2, device 2 checks whether the CPID information sent by CP2 is the same as the CPID information obtained by device 2, and stores the part of the CPID sent by CP2 which are not yet stored on device 2 into device 2.

Step 411: From device 2, CP3 obtains the CPID information received on device 2.

The method of CP3 obtaining CPID information of other CPs from device 2 is similar to step 26 in the embodiment shown in FIG. 1. In this embodiment, device 2 has obtained ID information of at least CP1 and CP2 through step 410. Therefore, the CPID list obtained by CP3 from device 2 includes IDs of at least CP1 and CP2.

Step 412: CP3 allocates access rights to the CPs in the CPID list.

For example, CP3 allocates rights of accessing device 2 to CP1. In this case, CP3 sends a right configuration command to device 2. The right configuration command may carry the ID of CP1 and access rights parameters of CP1. According to the right configuration command sent by CP3, device 2 allocates rights of accessing device 2 to CP1. Afterward, according to the configured access rights, device 2 authenticates the command from CP1, and therefore, CP1 can perform control operations for device 2 within the scope of access rights configured by CP3.

In the foregoing technical solution in this embodiment, CP3 may allocate rights of accessing device 2 to CP2, allocate rights of accessing device 1 to CP1, and allocate rights of accessing device 1 to CP2. Besides, CP3 may obtain the CPID list from device 1, and allocates rights of accessing device 1 or device 2 to the CPs in the CPID list (not illustrated in FIG. 4).

In this embodiment, it is assumed that the UPnP network is composed of three CPs and two UPnP devices. However, it is understandable to those skilled in the art that the access rights can be configured for the CPs according to the technical solution similar to this embodiment when more CPs and/or more UPnP devices exist in the network.

In this embodiment, the CP can add its ID information and the ID information of other CPs obtained by this CP to the device, thus shortening the time of obtaining the CPID information in the network, and improving efficiency of communication between the CP and the UPnP device. Besides, when multiple UPnP devices exist in the network, the CP with administrator rights can obtain IDs of other CPs from any UPnP device, thus improving flexibility of networking.

Figure 5:
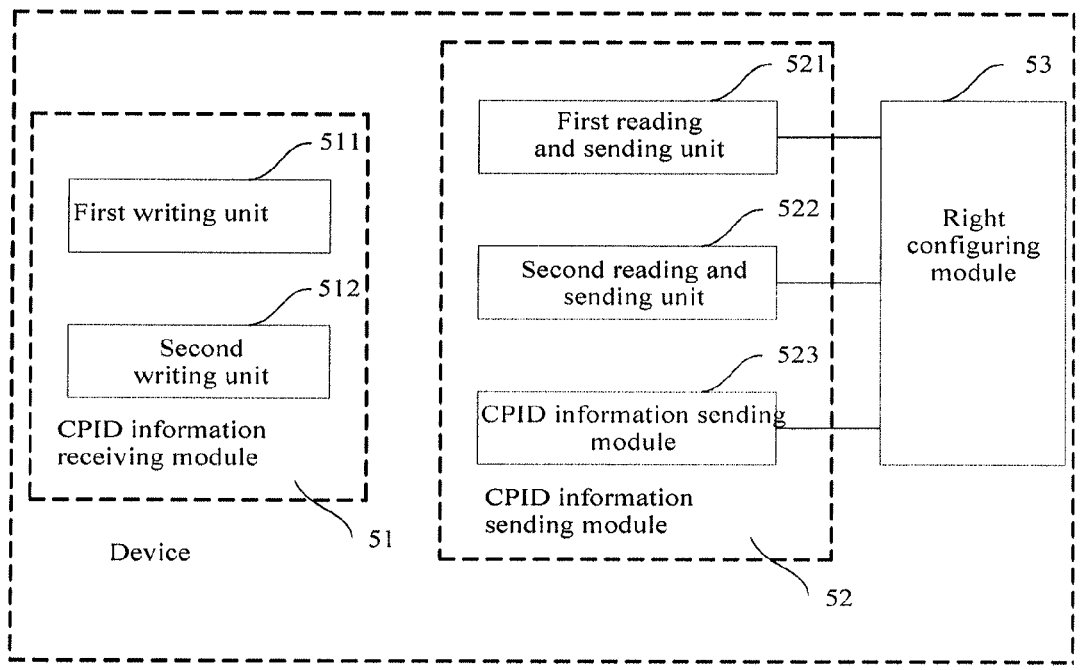
FIG. 5 shows a structure of a device provided in the fifth embodiment of the present invention.

FIG. 5 shows a structure of a UPnP device provided in the fifth embodiment of the present invention. As shown in FIG. 5, the device provided in this embodiment includes:

a CPID information receiving module 51, adapted to receive CPID information sent by a first CP without administrator rights, where the CPID information includes an ID of the first CP and/or an ID of another CP obtained by the first CP;

a CPID information sending module 52, adapted to send a CPID list that carries the CPID information to a second CP with administrator rights; and a right configuring module 53, adapted to: receive a CP right configuration command sent by the second CP, and configure access rights for CPs in the CPID list.

In the foregoing technical solution, the CPID information receiving module 51 may further include at least one of the following units:

a first writing unit 511, adapted to: receive a CPID writing command that carries the CPID information from the first CP, and store the CPID information; and a second writing unit 512, adapted to: receive CPID information and information about an address information for storing the CPID information from the first CP, and store the CPID information according to the address information.

In the foregoing technical solution, the CPID information sending module 52 may further include at least one of the following units:

a first reading and sending unit 521, adapted to: receive a CPID reading command sent by the second CP, and send the CPID list that comprises the CPID information to the second CP;

a second reading and sending unit 522, adapted to: receive information about an address for storing CPID information from the second CP, and send the CPID list that comprises the CPID information to the second CP, where the CPID list is stored in the position corresponding to the address information; and a third sending unit 523, adapted to send the CPID list that carries CPID information to the second CP through an event.

On the basis of the foregoing technical solution, the CPID information sending module 52 may be further adapted to send the CPID list that carries the CPID information to the first CP which holds no administrator rights.

Through this embodiment, it is not necessary to deploy a dedicated apparatus for configuring and managing rights of accessing the UPnP device for CPs in the networking process. Information about all CPs in the network can be obtained through only two types of apparatuses (namely, CP and UPnP device provided in this embodiment), and any CP in the network can be configured as having administrator rights to configure and manage access rights of other CPs, thus simplifying the networking. In practice, the UPnP device may be a home network device in a UPnP network, and the UPnP device interacts with the CP in the UPnP network to configure access rights, as shown in FIG. 1-FIG. 4.

Figure 6:
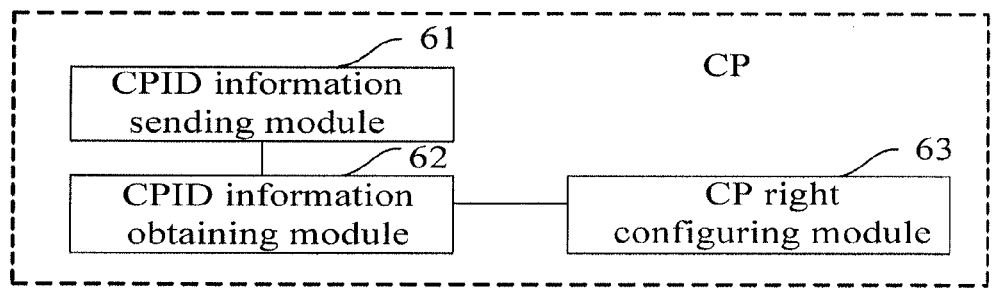
FIG. 6 shows a structure of a CP provided in the sixth embodiment of the present invention.

FIG. 6 shows a structure of a CP provided in the sixth embodiment of the present invention. As shown in FIG. 6, the CP provided in this embodiment includes:

a CPID information sending module 61, adapted to send CPID information to a UPnP device, where the CPID information includes an ID of this CP and/or an ID obtained from another CP;

a CPID information obtaining module 62, adapted to obtain a CPID list that comprises the CPID information from the UPnP device; and a CP right configuring module 63, adapted to send a CP right configuration command to the UPnP device, where the command instructs the UPnP device to configure access rights for CPs in the CPID list.

The CP provided in this embodiment exchanges CPID information with the UPnP device, and configures rights of accessing the UPnP device for the corresponding CPs according to the obtained CPID information. In the network constructed with the CP in this embodiment, any CP can be configured as having administrator rights or not, and therefore, it is not necessary to set a dedicated apparatus for configuring and managing access rights of CPs, thus simplifying the networking and improving flexibility of the networking. The method of configuring access rights through interaction between the CP and the UPnP device in the network is described in the embodiments shown in FIG. 1-FIG. 4.

Figure 7:
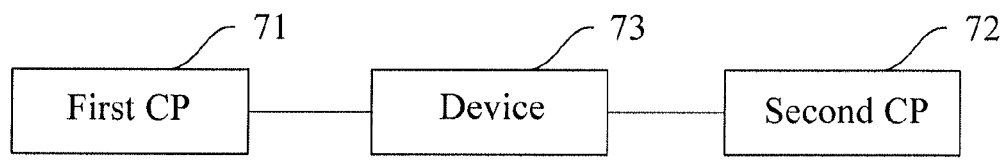
FIG. 7 shows a structure of a communication system provided in the seventh embodiment of the present invention.

FIG. 7 shows a structure of a communication system provided in the seventh embodiment of the present invention. As shown in FIG. 7, the communication system provided in this embodiment includes a first CP 71 without administrator rights, a second CP 72 with administrator rights, and a UPnP device 73.

The first CP 71 is adapted to send CPID information to the UPnP device 73, where the CPID information includes an ID of the first CP and/or IDs of other CPs obtained by the first CP.

The second CP 72 is adapted to: obtain a CPID list that carries the CPID information from the UPnP device 73, and send a CP right configuration command to the UPnP device, where the command instructs the UPnP device to configure access rights for CPs corresponding to CPIDs in the CPID list.

The UPnP device 73 is adapted to: receive the CPID information sent by the first CP 71, send a CPID list that carries the CPID information to the second CP 72, and configure access rights for the CPs in the CPID list after receiving a CP right configuration command sent by the second CP 72.

Through this embodiment, it is not necessary to deploy a dedicated apparatus for configuring and managing rights of accessing the UPnP device for CPs in the networking process. Information about all CPs in the network can be obtained through only two types of apparatuses (namely, CP and UPnP device provided in this embodiment), and any CP in the network can be configured as having administrator rights to configure and manage access rights of other CPs, thus simplifying the networking. With respect to detailed implementation mode, the modules included in the first CP and the second CP in this embodiment are described in the embodiment shown in FIG. 6. The modules included in the UPnP device in this embodiment are described in the embodiment shown in FIG. 5, and the method of configuring access rights through interaction with the CPs in the UPnP network is described in the embodiments shown in FIG. 1-FIG. 4.

It is understandable to those skilled in the art that the accompanying drawings are only schematic diagrams of the preferred embodiments, and the modules or processes in the accompanying drawings are not mandatory for implementing the present invention.

It is understandable to those skilled in the art that the modules in an apparatus provided in an embodiment of the present invention may be distributed into the apparatus described herein, or may be located in one or more apparatuses different from the apparatus described herein. The modules may be combined into one module, or split into multiple submodules.

The serial number of the embodiments of the present invention is designed to facilitate description only, and does not represent priority of the embodiments.

Persons of ordinary skilled in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk, or a CD-ROM.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall in the scope of protection defined by the following claims or their equivalents.

What is claimed is:

1. A method for configuring access rights, comprising:
   receiving Control Point Identifier (CPID) information sent by a first Control Point (CP) without administrator rights, wherein the CPID information comprises an identifier (ID) of another CP obtained by the first CP;
   communicating a CPID list that comprises the CPID information to a second CP with administrator rights; and
   receiving a CP right configuration command from the second CP, and configuring access rights for at least one CP corresponding to a CPID in the CPID list.

2. The method for configuring access rights according to claim 1, wherein:
   the ID comprises at least one of: a CP public key and a hash value of the CP public key.

3. The method for configuring access rights according to claim 1, wherein receiving of the CPID information from the first CP without administrator rights comprises:
   receiving a CPID writing command that carries the CPID information from the first CP; and
   storing the CPID information according to the CPID writing command.

4. The method for configuring access rights according to claim 1, wherein receiving of the CPID information from the first CP without administrator rights comprises:
   receiving, from the first CP, the CPID information and address information that defines an address for storing the CPID information; and
   storing the CPID information to the address.

5. The method for configuring access rights according to claim 1, wherein sending of the CPID list that comprises the CPID information to the second CP with administrator rights comprises:
   receiving a CPID reading command from the second CP; and
   sending the CPID list that comprises the CPID information to the second CP according to the CPID reading command.

6. The method for configuring access rights according to claim 1, wherein sending of the CPID list that comprises the CPID information to the second CP with administrator rights comprises:
   receiving address information that defines an address for storing the CPID information from the second CP; and
   sending the CPID list that comprises the CPID information to the second CP, wherein the CPID list is stored in a position corresponding to the address defined by the address information.

7. The method for configuring access rights according to claim 1, wherein sending of the CPID list that comprises the CPID information to the second CP with administrator rights comprises:
   sending the CPID list that carries the CPID information to the second CP based on an occurrence of an event.

8. The method for configuring access rights according to claim 3, wherein sending of the CPID list that comprises the CPID information to the second CP with administrator rights comprises:
   receiving a CPID reading command from the second CP; and
   sending the CPID list that comprises the CPID information to the second CP according to the CPID reading command.

9. A device, comprising:
   a Control Point Identifier (CPID) information receiving adapted to receive CPID information communicated by a first Control Point (CP) without administrator rights, wherein the CPID information comprises an identifier (ID) of another CP obtained by the first CP;
   a CPID information sending adapted to send a CPID list that comprises the CPID information to a second CP with administrator rights; and a right configuring adapted to receive a CP right configuration command from Lhe second CP, and configure access rights for at least one CP corresponding to a CPID in the SPID list.

10. The device of claim 9, wherein the CP information receiving module comprises a first writing unit adapted to receive a CPID writing command that carries the CPID information from the first CP, and store the CPID information according to the writing command.

11. The device of claim 9, wherein the CP information sending module comprises a first reading and sending unit adapted to receive a CPID reading command sent by the second CP, and send the CPID list that comprises the CPID information to the second CP according to the CPID reading command.

12. The device of claim 10, wherein the CP information sending module comprises a first reading and sending unit adapted to receive a CPID reading command sent by the second CP, and send the CPID list that comprises the CPID information to the second CP according to the CPID reading command.

13. A Control Point (CP), comprising:
a Control Point Identifier (CPID) information obtaining module adapted to obtain a CPID list that comprises CPID information from a first device; and
a CPID information sending module adapted to send the CPID information to a second device, wherein the CPID information comprises an ID of another CP.

14. A communication system, comprising:
a first CP without administrator rights adapted to send Control Point Identifier (CPID) information, wherein the CPID information comprises an identifier (ID) of another CP obtained by the first CP;
a device adapted to receive the CPID information from the first CP, communicate a CPID list that carries the CPID, information, and configure access rights for one or more CPs specified in the CPID list according to a CP right configuration command; and
a second CP with administrator rights adapted to obtain the CPID list that comprises the CPID information from the device, and communicate the CP right configuration command to the device, wherein the command instructs the device to configure access rights for the one or more CPs corresponding to CPIDs in the CPID list.

15. The device of claim 9, wherein the CP information receiving module comprises a second writing unit adapted to receive, from the first CP, the CPID information and address information that defines an address for storing the CPID information, and store the CPID information to the address.

16. The device of claim 9, wherein the CP information sending module comprises a second reading and sending unit adapted to receive information about an address for storing the CPID information from the second CP, and send the CPID list that carries the CPID information to the second CP, wherein the CPID list is stored in a position corresponding to the address information.

17. The device of claim 9, wherein the CP information sending module comprises a third sending unit adapted to send the CPID list that carries the CPID information to the second CP through an event.

18. The device of claim 10, wherein the CP information sending module comprises a second reading and sending unit adapted to receive information about an address for storing the CPID information from the second CP, and send the CPID list that carries the CPID information to the second CP, wherein the CPID list is stored in a position corresponding to the address information.

19. The device of claim 10, wherein the CP information sending module comprises a third sending unit adapted to send the CPID list that carries the CPID information to the second CP according to occurring of an event.

* * * * *